United States Patent

[11] 3,601,466

[72] Inventors Tadao Tsuruta;
 Yoshinobu Ito, both of Tokyo, Japan
[21] Appl. No. 831,561
[22] Filed June 9, 1969
[45] Patented Aug. 24, 1971
[73] Assignee Nippon Kogaku K.K.
 Tokyo, Japan
[32] Priority June 21, 1968
[33] Japan
[31] 42530/1968

[54] METHOD FOR DETECTING AN ABERRATION-COMPENSATED IMAGE
 3 Claims, 3 Drawing Figs.
[52] U.S. Cl. ................................................. 350/3.5,
 350/162 SF, 356/129
[51] Int. Cl. ..................................................... G02b 27/38,
 G02b 27/00
[50] Field of Search .......................................... 350/3.5,
 162 SF; 356/106, 107, 129; 73/67.5 H

[56] References Cited
 UNITED STATES PATENTS
 2,655,074 10/1953 Eckert et al. ................. 356/107
 3,501,216 3/1970 Kogelnik ..................... 350/3.5

OTHER REFERENCES

Brooks, R. E., Electronics, Vol. 40, No. 10, May 1967 pp. 88–90 (copy in 350/3.5)

Enos, A. E., Contemporary Physics, Vol. 8, No. 2, Mar. 1967 pp. 153–170, pp. 162–170 relied upon, (copy in 350/3.5)

*Primary Examiner*—David Schonberg
*Assistant Examiner*—Ronald J. Stern
*Attorney*—Anton J. Wille ABSTRACT: This invention relates to a method for sharply detecting an image which comprises, preparing a hologram with an aberration-free wave front and an aberration wave front, illuminating the hologram with a wave front produced as a result of removing only the change in light path length caused by a phenomenon to be measured or of adding newly the change in the light path length from or to the aberration front, and effecting filtering such as the schlieren method or phase difference method at the focus of the aberration-free wave front against the change in the wave front caused by the phenomenon and superimposed on the aberration-free wave front.

METHOD FOR DETECTING AN ABERRATION-COMPENSATED IMAGE

This invention relates to a method for detecting an image by means of filtering such as by the schlieren method or phase difference method after compensating for aberration.

In conventional schlieren method or phase difference method, when some aberrations remain in the optical system, especially when the object body or object phenomenon is placed within a container of complicated shape, the point image or slit image to undergo filtering is expanded on the focal plane due to aberrations caused by the container. Therefore, it is usual that the accuracy of detection of change in light path difference by means of schlieren method or phase difference method is extremely poor compared with that of an aberration-free optical system.

An object of this invention is to offer a method which removes the aberrations remaining in the optical system and, enables high accuracy detection of the change in light path difference by selectively picking up only the difference in light path length produced by inserting a phenomenon or an object in the light path and superimposing the picked up difference on the aberration-free wave front.

In conventional schlieren apparatus, it is not an easy task to remove the spherical aberration and astigmatism peculiar to the apparatus. But, according to this invention, it is possible to remove these disturbing aberrations as is clearly shown in the description of the example described later. Moreover, it is possible to measure with high sensitivity a phenomenon that takes place in a container of complicated shape since the aberrations caused by the container can be removed.

This invention will be described more clearly referring to the illustrative embodiment shown in the attached drawings, in which.

Figure 1:
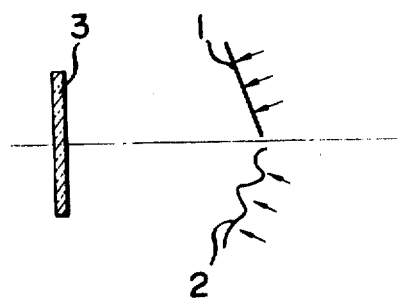
FIG. 1 is a drawing showing the principle of this invention.

First the principle on which this invention is based will be described. In FIG. 1, two light wave fronts 1 and 2, coherent with each other, are incident upon a dry plate 3 at a certain angle. After development, said dry plate (called a hologram) is placed at the original position. When the dry plate is illuminated by the wave front 1 the wave front 2 is regenerated at the original position and when the dry plate is illuminated by the wave front 2, the wave front 1 is regenerated at its original position. Assume that the wave front 1 is an aberration-free wave front and the wave front 2 a wave front containing aberrations, in accordance with this explanation, it will be understood that a wave front containing aberration has been converted into an aberration-free wave front. When a hologram prepared in this way is illuminated by a light formed by adding a slight change $\Delta$ of light path length to the wave front 2, a wave front formed by adding $\Delta$ to the aberration-free wave front 1 is reproduced.

In this way the aberrations of the optical system itself is completely eliminated and only the change in the light path length that has been introduced between the hologram preparation (exposure) and the regeneration can be observed by schlieren method or phase difference method as the cause disturbing the aberration-free wave front. The above-mentioned handling can be applied quite similarly to the case in which a hologram is prepared under the condition wherein a phenomenon is then contained, and the said phenomenon is removed from the light path at time of regeneration.

Figure 3:
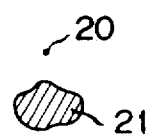
FIG. 3 is a drawing showing the image at the focal plane of the example of FIG. 2.
Figure 2:
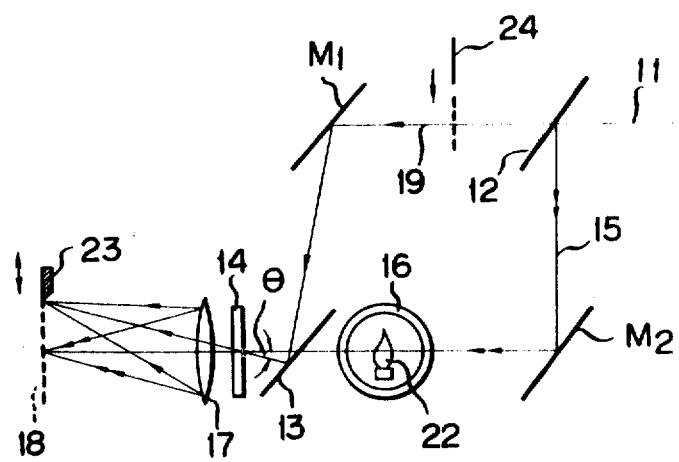
FIG. 2 is an optical layout of an example of this invention.

Next, an example of this invention will be described in detail referring to FIG. 2. In FIG. 2, the parallel light 11 from a coherent light source is divided into two directions by a half mirror 12, meet again through a half mirror 13 by way of reflecting mirrors $M_1$ and $M_2$ respectively, and strike a photographical dry plate 14, making an angle of $\theta$ to each other. On the other hand, a container 16 such as a glass pipe is placed in light path 15. Then, a sharp point image 20 (refer to FIG. 3) due to a light path 19 and an image 21 (refer to FIG. 3) that has passed through the light path 15 and has been expanded by the aberration caused by the container 16 can be obtained on the focal plane 18 of an objective lens 17. If, in this arrangement, the dry plate 14 is exposed and placed to the original position after development and then illuminated by only the light passing through the light path 15 by shielding the light path 19 with a shutter 24, the sharp point image 20 is reproduced and, when a phenomenon 22 is placed in the container 16, the disturbance of the wave front due to said phenomenon works to degrade the sharpness of the point image 20. When a knife edge 23 is moved along a focal plane 18 to cut the focus 20 of the aberration-free wave front, a dark and light pattern is produced corresponding to the change in light path length at the position of the phenomenon 22. In other words, a schlieren image is obtained. If a phase plate is placed at the focus 20, a dark and light image showing the phase distribution can be obtained in similar manner.

Since a point image having a favorable coherence is cut, a uniform field can be obtained easily, and the sensitivity of the schlieren method or phase difference method becomes very high in order to pick up the phenomenon change which is superimposed on the aberration-free system.

We claim:

1. A method for eliminating the effects of aberrations introduced into an optical system for detecting an object using a single coherent light source, the aberrations resulting from a cell containing the object and from imperfections of the optical system itself, comprising the steps of:

splitting light from said source into an object beam which is directed through the cell onto a film positioned within the system and into a reference beam which is passed directly onto the film along a path angularly displaced with respect to the object beam, the cell having an empty state and another state containing the object, said reference beam comprising an aberration free wave front;

exposing the film with the cell in one state;

developing the film;

restoring the developed film into essentially the same position within the optical system;

placing the cell into the other state;

reconstructing the reference beam by passing light from said coherent source through the object beam path only;

focusing with a lens the reconstructed beam in the rear focal plane of said lens; and spatially filtering the reconstructed beam in said plane at the focal point of the reconstructed reference beam.

2. A method as in claim 1 wherein said filtering step comprises placing a knife edge in the focal plane at the focus of the reconstructed reference beam.

3. A method as in claim 1 wherein said filtering step comprises placing a phase plate at the focus of the reconstructed reference beam.